May 11, 1943.  F. W. HACK  2,318,938
UNIVERSAL MACHINE TOOL
Filed May 1, 1940  5 Sheets-Sheet 5
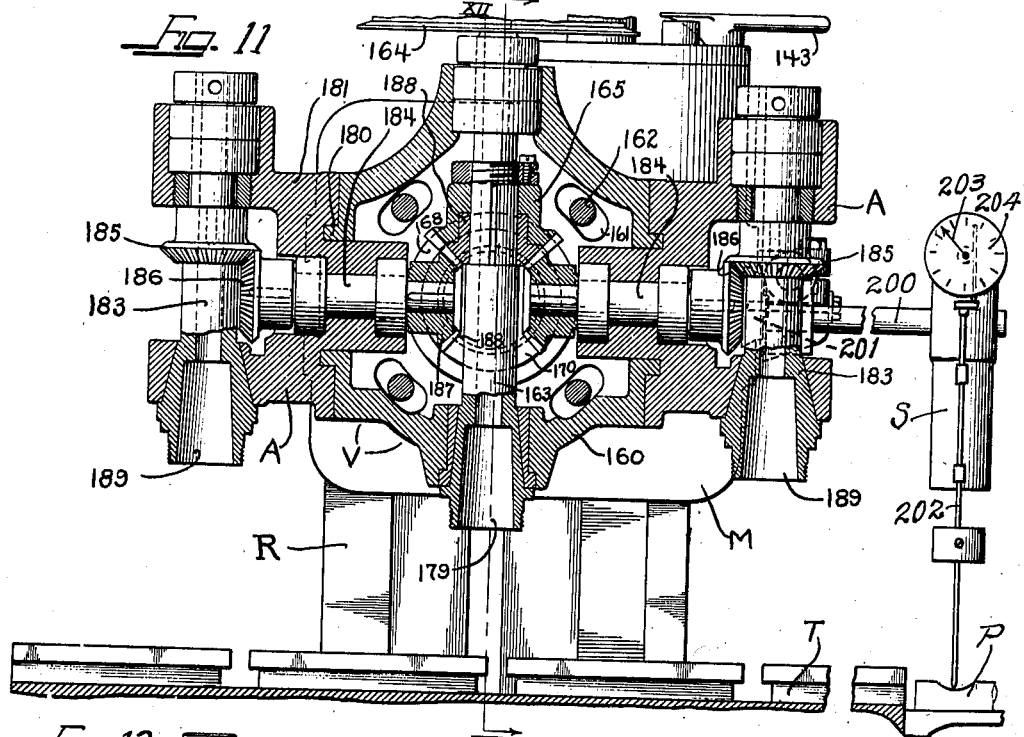
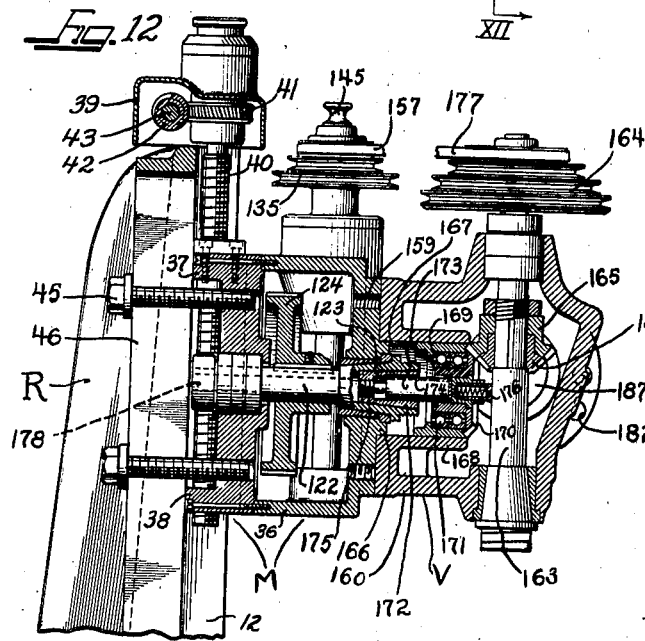
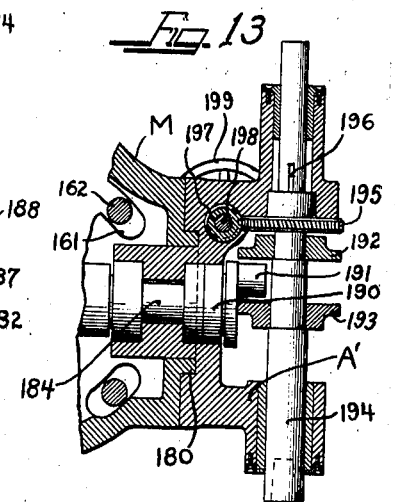
Inventor
Frank W. Hack Patented May 11, 1943

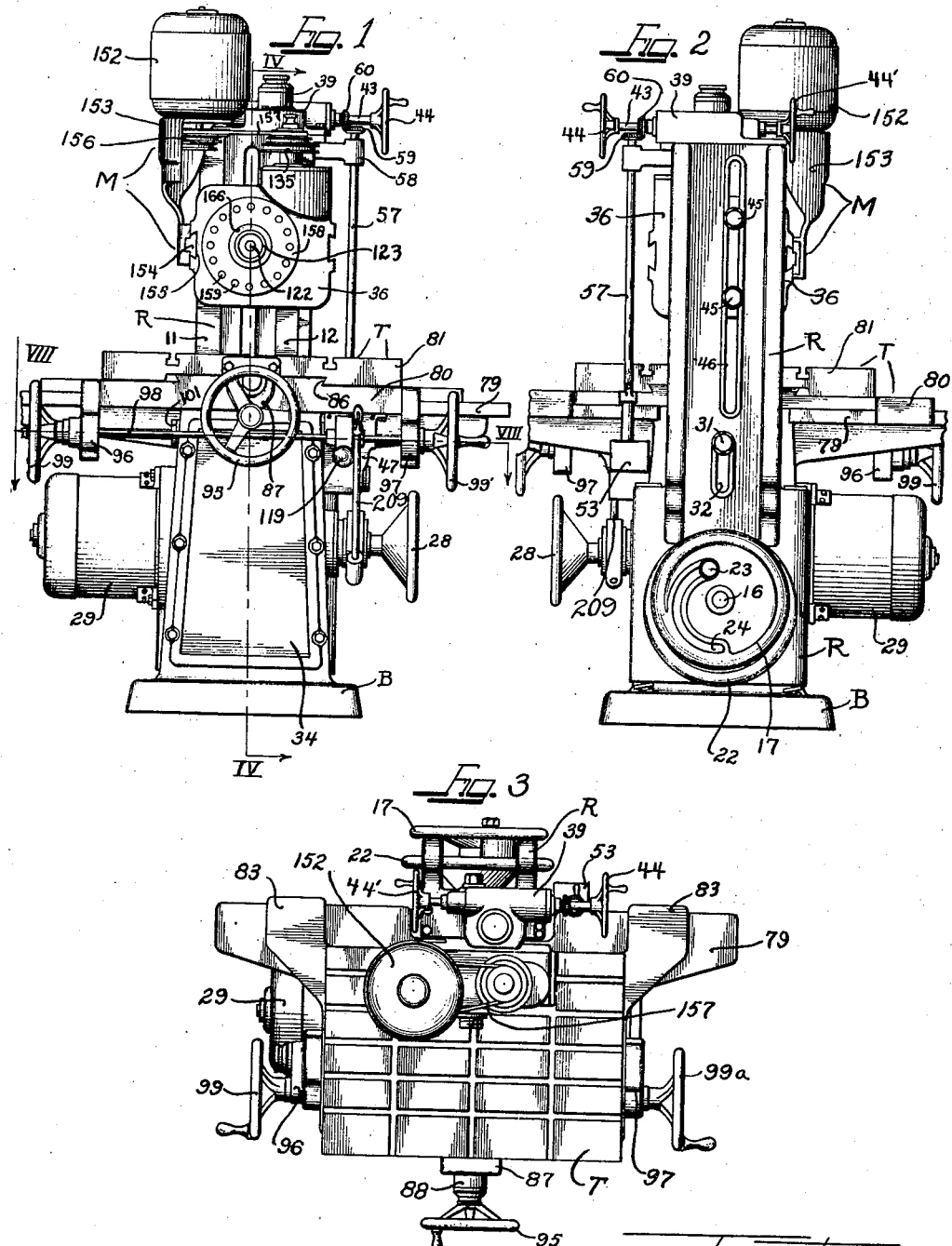

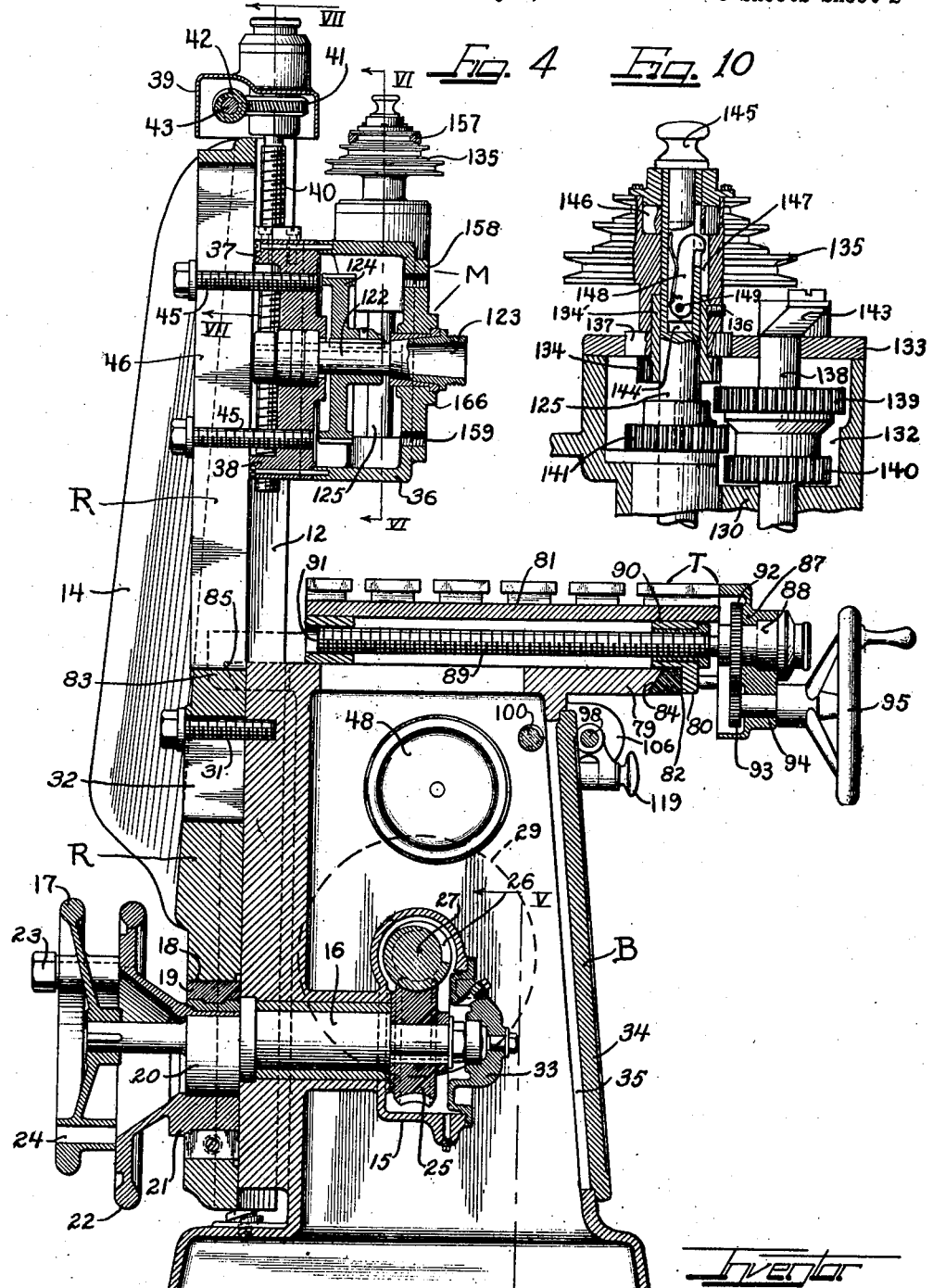

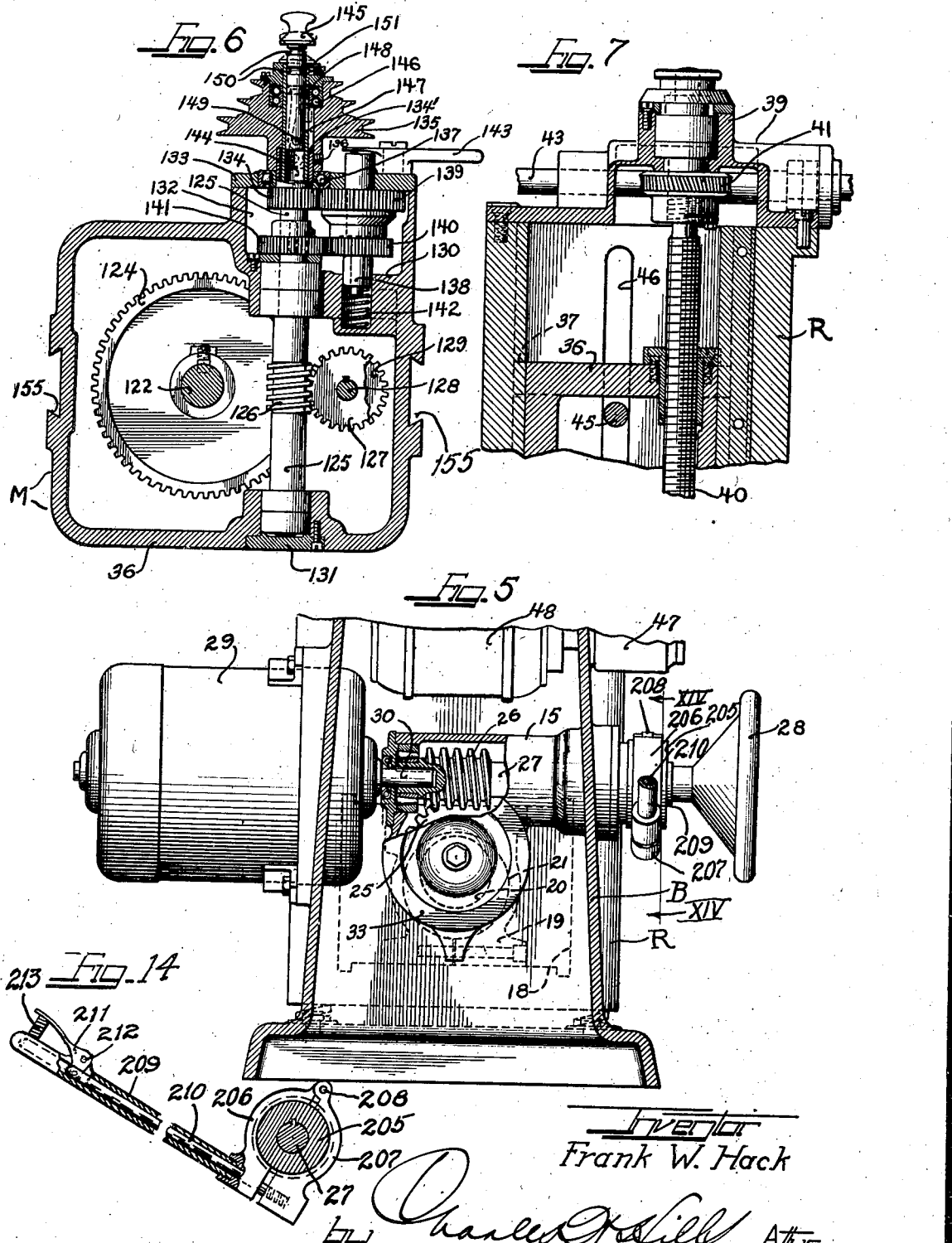

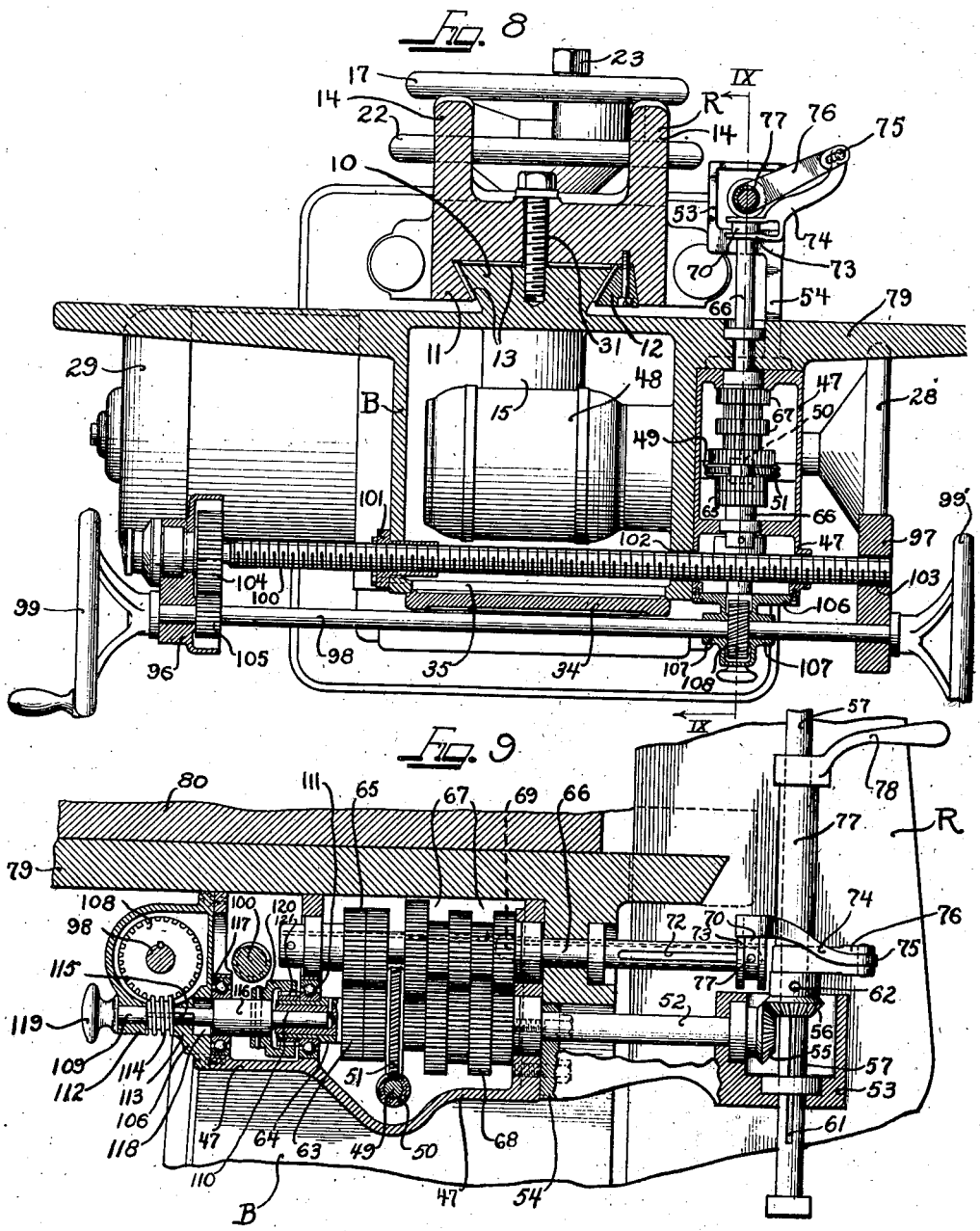

2,318,938

UNITED STATES PATENT OFFICE 2,318,938

UNIVERSAL MACHINE TOOL

Frank W. Hack, Des Plaines, Ill., assignor to Reconstruction Finance Corporation, Chicago, Ill., a corporation of the United States Application May 1, 1940, Serial No. 332,677

13 Claims. (Cl. 29—27)

My invention relates to a machine having a wide range of utility and especially adaptable for precision machine work and tool and die making for the performance of work which heretofore had to be accomplished on separate machines.

The machine of this invention is of the type disclosed in my co-pending application Serial No. 151,153, filed June 30, 1937, and issued into Patent No. 2,181,128, dated November 28, 1939, and the invention involves a number of improvements over the machine disclosed in such patent so as to simplify some of the operations and increase the range of adaptability of the machine.

My improved machine is shown on the accompanying drawings, in which:

Figure 1 is a front elevation of the machine;

Figure 2 is a rear elevation;

Figure 3 is a plan view;

Figure 4 is an enlarged section on the plane IV—IV of Figure 1;

Figure 5 is a section substantially on the plane V—V of Figure 4;

Figure 6 is an enlarged section on the plane VI—VI of Figure 4;

Figure 7 is an enlarged section on the plane VII—VII of Figure 4;

Figure 8 is an enlarged section on the plane VIII—VIII of Figure 1;

Figure 9 is an enlarged section on the plane IX—IX of Figure 8;

Figure 10 is an enlarged view of the upper portion of Figure 6;

Figure 11 is a front elevation of the upper part of the ram structure, with the master head down and with vertical and auxiliary heads supported by the master head;

Figure 12 is a section on the plane XII—XII of Figure 11;

Figure 13 is a section showing a modified form of auxiliary head for attachment to the vertical head; and Figure 14 is a section on the plane XIV—XIV of Figure 5.

Referring to Figures 1 to 4, the machine comprises a supporting frame or pedestal structure B, a ram structure R and a table structure T. The supporting frame or pedestal B is of generally rectangular cross-section and is hollow, and on its rear side has a dovetail vertical guide extension or rail 10 for guiding the vertical movement of the ram structure, as best shown in Figure 8. The ram structure on its front side has dovetail guide flanges between which the guide rail 10 is received. A suitable friction-reducing bearing roller structure 13 is interposed between the guide rail and the flanges, and the flange 12 is in the form of an adjustable gib for taking up wear and assuring intimate engagement of the ram structure with the guide rail so as to assure accurate movement of the ram and hold it to its vertical movement without give or play. The ram structure may be strengthened by ribs 14.

Referring particularly to Figures 4 and 5, the base structure has a transmission gearing housing 15 therein supported by the rear wall thereof. Journalled in the gear housing and the rear wall is a shaft 16 whose outer end supports a hand wheel 17. The ram structure at its lower end has a transversely extending rectangular cross-passageway 18 in which a yoke 19 is slidable. An eccentric 20 forming part of or secured to the shaft 16 receives the eccentric hub 21 of the hand wheel 22, this hub being journalled in the yoke 19. With this arrangement, the outer eccentric 21 may be set by the hand wheel 22 relative to the hand wheel 17 and the eccentric 20 for any desired length of vertical stroke of the ram structure when the shaft 16 is turned. A set screw extends from the handle 22 through the slot 24 in the hand wheel 17, and after a setting operation, the set screw is tightened to maintain the setting for the desired stroke.

A worm wheel 25 within the gear housing 15 is keyed to the inner end of the shaft 16 and meshes with a worm pinion 26 on the shaft 27 journalled in the gear housing above the worm gear, the shaft outside of the base structure B terminating in a hand wheel 28 for hand-turning of the worm shaft and vertical setting of the ram structure R. On the side of the base structure B opposite to the hand wheel 28 is mounted an electric motor 29 which projects a distance into the base B with the end of its armature shaft 30 extending into the gear housing 15 for detachable key-connection with the inner end of the shaft 27. The worm shaft can thus be power driven for driving of the eccentric structure and vertical reciprocation of the ram structure. A set screw 31, extending through a longitudinal slot 32 in the ram structure, will serve to rigidly lock the ram structure against vertical movement if, in the use of the machine, the ram structure is to be locked in a certain vertical position.

With the motor or armature shaft 30 detachably keyed to the worm shaft, as best shown in Figure 5, the motor may be readily removed at any time for repairs. A removable closure cap 33 may be provided for the gear housing 15 for access to the gearing therein, and a removable cover 34 may be provided for the access opening 35 in the base B for access to the interior of the base.

A master head structure M is mounted on the upper part of the ram structure to form a permanent part thereof. This master head structure comprises a frame 36 whose rear wall has upper and lower dovetail extensions 37 and 38 engaging with the ram between the guide flanges 11 and 12 thereof, at best shown in Figure 4. Mounted on top of the ram is a gear housing 39 which journals the upper end of a screw shaft 40 which extends through the dovetail extensions 37 and 38 of the master head frame structure, so that upon turning of the screw shaft, the master head may be adjusted or shifted vertically on the ram structure.

Within the housing 39, a worm gear 41 is secured to the screw shaft and is meshed by a worm pinion 42 mounted on the shaft 43 extending into the housing, the outer end of the shaft having a hand wheel 44 by which the shaft may be manually operated for adjustment of the master head. Set screws 45 extend through the longitudinal slots 46 in the ram into threaded engagement with the master head frame so that the master head may be locked against vertical movement in any of its set positions. The screw shaft 40 extends through the dovetail extensions 37 and 38 at one side thereof so as to clear the set screws. As shown in Figure 2, the shaft 43 may extend entirely through the housing 39, with the hand wheel 44 at one end thereof and a similar hand wheel 44' at the other end thereof, so that the shaft may be manually controlled from opposite sides of the machine for setting of the master head.

The screw shaft 40 may also be power driven. Referring to Figures 8 and 9, a gear housing 47 is mounted on the right side of the base B below the top thereof, and within the base is the motor 48 whose armature shaft 49 projects into the housing 47 and carries a worm pinion 50. The worm pinion 50 meshes a worm gear 51 for driving a shaft 52 extending transversely through and rearwardly from the housing 47 into a housing 53 at the end of a supporting bracket 54 on the base structure. Within the housing 53, the outer end of the shaft 52 carries a bevel gear 55 which meshes with a bevel gear 56 on the vertical shaft 57, this shaft extending upwardly through a bearing bracket 58 (Figure 1) at the upper end of and movable with the ram, the upper end of this shaft mounting a bevel gear 59 meshing with a bevel gear 60 on the shaft 43 which controls the rotation of the screw shaft 40 for the master head. As the ram at times moves vertically relative to the base B, and the shaft 52 and housing 53 are on the base B, the shaft 57 is longitudinally slidable relative to the housing 53 and is provided with a keyway 61 receiving a pin 62 on the bevel gear 56.

The driving worm wheel 51 may be directly connected to the shaft 52 for drive of the vertical shaft 57 but provision is preferably made for adjusting the speed of rotation of the shaft 57 and the screw shaft 40 for predetermined rate of travel of the master head on the ram, as, for example, where a drill or other tool is to be fed into work on the table T at a predetermined rate. Speed-changing mechanism is therefore associated with the driving gear 51, and instead of direct connection of this gear with the shaft 52, the gear 51 is connected to a gear 63 on a shaft 64 which is co-axial with the shaft 52, the gear 63 being in mesh with a gear 65 on a countershaft 66. Gears 67 are mounted on the shaft 66 for connection with companion transmission gears 68 on the shaft 52. Slidable in the shaft 66 is a key 69 for selectively keying any one of the gears 67 to the shaft 66. The outer end of the key 69 is secured to a collar 70 by a pin 71, the collar surrounding the shaft 66 and the pin extending through a longitudinal slot 72 in the shaft 66 so that when the collar is shifted, the end of the key may be brought into engagement with any one of the gears 67 for driving connection thereof with the shaft 66.

The collar 70 is received in the fork end 73 of an arm 74 which at its outer end has pin-and-slot connection 75 with a lever 76 extending from the lower end of the sleeve 77 surrounding the shaft 57 above the bevel gear 56. The upper end of the sleeve 77 has an actuating lever 78 extending therefrom, and when this lever is turned for swing of the lever 76, the arm 74 is moved to shift the collar 70 along the shaft 66 for movement of the key 69 for the desired gear 67 and the resulting speed variation in drive of the shaft 52. Thus, the power drive for the screw shaft 40 may be set for any desired rate of travel of the master head and the ram structure.

The table structure T is mounted on the top wall 79 of the base structure B. The table comprises a lower part 80 and an upper part 81. The lower part 80 has dovetail ends 82 and 83 receiving the front and rear dovetailed edges 84 and 85 of the base top wall 79 for guiding the lower table part laterally on the top wall 79. The upper table part 81 has dovetail connection 86 with the lower table part, as clearly shown in Figures 1 and 2, for fore and aft movement of the top table part on the lower part.

At the front edge of the upper table part (Figure 4) is a depending housing 87 for journalling the head 88 of a screw shaft 89 which has threaded engagement with a bushing 90 secured in the front side of the lower table 80, the rear end of the screw shaft being guided in the passageway 91 at the rear end of the lower table 80. Within the housing 87, the screw shaft head carries a gear 92 meshing with a pinion 93 on a shaft 94 mounting at its outer end a hand wheel 95. Upon turning of the hand wheel, the screw shaft is turned in the bushing 90, and the upper table part 81 will be shifted fore and aft on the lower table part.

The setting and operating means for the lower table part are best shown in Figures 1, 8 and 9. The lower table part has at its opposite sides housings 96 and 97 depending therefrom. Journalled in these housings and extending transversely along the front of the base B is a shaft 98 which at its outer ends has hand wheels 99 and 99' respectively, by which the shaft may be manually operated. Rearwardly of the shaft 98 is a screw shaft 100 which extends through the base B. The shaft 100 has threaded engagement with a bushing 101 secured to the left side wall of the base, passes through a passageway 102 in the opposite side wall of the base, and then passes through the housing 47 into the clearance passageway 103 in the housing 97, as clearly shown in Figure 8.

Within the housing 96, the screw shaft 100 carries a gear 104 meshing with a pinion 105 on the shaft 98 so that, upon turning of the shaft 98, the screw shaft will be rotated in the stationary bushing 101 and the entire table structure will be shifted laterally on the base top 79.

Means are provided for power drive of the screw shaft 100. Referring to Figures 8 and 9, the front end of the housing 47 has a detachable extension 106 through which the shaft 98 extends, the housing extension providing bearings 107 for the shaft, between which bearings engages a worm gear 108 keyed to the shaft. Below the worm gear 108 and in axial alignment with the shaft 64 of the transmission gearing within the housing 47 is a shaft or spindle 109 which at its inner end engages in the axial bore 110 in the outer end of the shaft 64 which is journalled in the adjacent wall of the housing 47 by a bearing 111. At its outer end, the shaft 109 extends through the separated bearing portions 112 and 113 on the housing extension 106, and mounted on the shaft between these bearing portions is a worm pinion 114 which meshes the worm gear 108. The pinion has a key extending into a slot 115 in the shaft so that the shaft may be shifted axially relative to the pinion.

The shaft 109 has an enlarged or hub part 116 engaging in a bearing 117 supported in the end wall of the housing 47, the housing extension 106 being provided with a recess 118 into which the part 116 may extend when the shaft 109 is shifted outwardly, the shaft having a knob 119 at its outer end whereby it may be readily shifted in or out.

Keyed to the inner end of the shaft enlargement 116 is an internal gear 120 for engaging the gear 121 secured to the outer end of the shaft 64. When the shaft 119 is in its inner position, as shown on Figure 9, the annular or internal gear 120 will be in mesh with the gear 121 on the shaft 64 so that the shaft 109 will be power-operated from the motor 48, through the shaft 49, worm pinion 50, and worm gear 51 connected with the shaft 64. Rotation of the shaft 109 will be communicated by the pinion 114 to the gear 108 on the shaft 98 and then, through the gearing connections 105 and 104, the screw shaft 100 will be turned and the table structure will be moved laterally on the base B. When the shaft 109 is pulled out, the gear 120 thereon will be unmeshed from the gear 121 on the shaft 64.

I have already described how the screw shaft 40 for the master head end may be power-driven from the motor 48, either directly or through transmission gearing. Referring to Figures 8 and 9, the key 69 may be set into neutral position so that the motor 48 may effect drive only of the table structure when the shafts 109 and 64 are geared together. By setting of the key 69 of the transmission gearing, as has been explained hereinbefore, the master head may also be power shifted by the motor 48 at any desired speed so that, for example, tools operated by the master head may be fed relative to work on the table while the table is being power shifted on the base B.

Referring again to the master head, this head may be used in a variety of ways for feeding, driving or otherwise operating different tools or tool supporting attachments applied to the head. Referring particularly to Figures 4, 6 and 10, a shaft 122 is suitably journalled in the front and rear walls of the master head frame or housing 36, the outer end of the shaft being shaped to provide a tapered recess or socket 123 which serves to receive and to centrally locate tools or attachments applied to the head. Within the housing 36, the shaft has keyed thereto a driving gear 124. Extending vertically through the housing 36 is a shaft 125. This shaft carries a worm 126 which is meshed by a worm gear 127 on the countershaft 128 which countershaft also supports a gear 129 which meshes with the gear 124.

An intermediate wall 130 in the housing 36 journals the shaft 125, a step bearing 131 journalling the lower end of the shaft. Above the intermediate wall 30 is a gear chamber 132 having a cover 133. The shaft 125 continues upwardly through the chamber 132 and the cover and extends through the tubular hub 134' of a gear 134 which surrounds the shaft 125 below the cover 133. The hub of a pulley 135 surrounds the hub 134' and is secured thereto as by a set screw 136. A bearing 137 in the cover receives and journals the gear hub 134'.

A countershaft 138 is journalled in the crosswall 130 and cover 133 and has a gear 139 secured thereto which is meshed by the gear 135. Another gear 140 which is secured on the shaft 138 meshes with the gear 141 keyed to the shaft 125 within the chamber 132. The shaft 138 is vertically slidable downwardly to unmesh the gears 139 and 140 from the gears 135 and 141, a spring 142 tending to hold the shaft in its upward position for meshing of the gears, a cam lever 143 being provided for depressing the shaft 138 when unmeshing of the gears is desired.

The outer end of the shaft 125 which extends through the gear 134 and the pulley has a bore 144 for a key-operating pin 145. Between the outer end of the pulley and the shaft 125 is interposed a bearing 146, and below this bearing the pulley has the keyway 147. Within the pin 145 is a key 148 pivoted at its lower end on a pin 149. When the pin 145 is in its outer position, as shown in full lines on Figure 6, the end of the key will be within the bearing 146 and out of the pulley keyway 147 so that the pulley will drive only the gear 134 and, when the transmission shaft 138 is in its upward position, the gears and the shaft will transmit the rotation of the gear 134 to the gear 141 on the shaft 125 for rotation of this shaft at reduced speed. If it is desired to drive the shaft 125 directly, the cam lever 143 is operated to shift the shaft 138 downwardly for unmeshing of the transmission gears, and the pin 145 is shifted inwardly to the position shown on Figure 10, in which position the key 148 will engage in the pulley keyway 147 and the pulley will then directly drive the shaft 125, rotation of the shaft being transmitted to the driving shaft 122 of the master head through the gearing 126, 127, 129 and 124. The pin 145 has detent channels 150 for engagement by a spring-pressed detent ball 151 for yieldably locking the pin in its inner or outer position.

A motor 152 is mounted on the master head for power drive of the shaft 122. As shown on Figures 1 and 2, this motor is supported by a bracket 153 detachably mounted on the master head frame 36. The bracket may have a dovetail key 154 thereon for engagement in the dovetail slot 155 provided on the frame 36 and the bracket may be adjusted along this slot. A pulley 156 is secured to the motor shaft for connection by a belt 157 with the pulley 135, the pulleys being each provided with a number of belt grooves, the pulleys shown having three such grooves, so that adjustment of the belt may be made for different driving speeds. The motor 152 thus forms part of the master head and moves therewith during vertical movement of the master head on the ram structure.

Figures 11 and 12 show a vertical head V which may be mounted on the master head. The master head has a cylindrical boss 158 on its front wall around the shaft 122, and threaded holes 159 are provided through this boss and the front wall of the head frame 36 for securing of the vertical head or other attachment to the master head, the threaded holes preferably being arranged in a circular row so that the attachment may be adjusted rotationally on the master head. The vertical head V shown on Figures 11 and 12 comprises a housing 160 whose rear wall has elongated slots 161 for the passage of screws 162 into threaded engagement with the master head openings 159 to secure the vertical head to the master head. Journalled in the upper and lower walls of the housing 160 is the vertical spindle 163 mounting at its upper end a pulley 164. Within the housing the spindle has keyed thereto a bevel gear 165.

On the front wall of the master head is a smaller centering boss 166 and in the rear wall of the vertical head housing 160 is a passageway 167 to receive this centering boss, an annular inwardly extending flange 168 on the rear wall of the vertical head housing forming a continuation of the passage 167. Within the flange 168 is a ring 169 in which a bevel gear 170 is journalled by the ball bearings 171, the gear meshing with the bevel gear 165 on the spindle 163. Within the conical socket 123 at the end of the master head shaft 122 is inserted a frusto-conical cup 172 for frictional engagement therewith. This cup or collet has a cylindrical bore for a cylindrical coupling bar 173 which has a key 174 engaging with the cup and with the hub of the gear 170 so that, as the cup is frictionally driven by the master head shaft 122, such drive will be communicated by the coupling bar 173 to the gear 170 for drive thereby of the gear 165 and the vertical spindle 163. An abutment screw 175 threads through the bottom of the cup 172 for holding the coupling bar connected with the gear 170, a spring-pressed plunger 176 within the gear 170 abutting the spindle 163 for keeping the gear 170 in proper meshing relation with the gear 165.

With the arrangement described, the spindle 163 will be driven from the master head spindle which is driven by belt connections between the motor 152 and pulley 135, and two speeds of drive are available by virtue of the direct connection of the pulley with the shaft 125 or the connection through the reduction gears 139 and 140, as has already been explained.

Instead of driving the vertical spindle 163 through the master head shaft, it may be directly driven by a belt 177 connecting between the pulley of the motor 152 and the pulley 164, and with a number of pulley grooves provided, the spindle 163 may thus be driven directly from the motor at various speeds. When the spindle is to be directly driven by the motor, the gear 170 should be released from the gear 165 on the spindle. The master head shaft 122 is provided with a bore 178 through which a suitable tool may be inserted for operation of the set screw 175, either for shifting of the gear 170 to mesh with the gear 165 or for withdrawal of the gear 170. By unscrewing the set screw, the spring-pressed plunger 176 will shift the gear 170 and its supporting ring 169 rearwardly in the flange 168 for unmeshing of the gear 170 from the gear 165, the connecting bar 173 then moving rearwardly in the cup or collet 172. The spindle 163 has the socket 179 in its lower end for receiving collets or other parts for securing tools or attachments to the spindle.

Auxiliary heads A may be attached to the vertical head V with tool supporting parts therein to be driven from the spindle 163. As shown on Figure 11, the side walls of the vertical head housing 160 have centering bosses 180 for receiving the bases 181 of auxiliary heads such as the heads A. Threaded holes 182 may be provided in the side walls of the head V for receiving screws extending through the bases of auxiliary heads so that these auxiliary heads may be set in any desired angular position on the vertical head.

Each of the auxiliary heads shown journals a vertical spindle 183 adapted to support tools, a drive shaft 184 extending into the body of the vertical head, the vertical spindle having a bevel gear 185 meshing with a bevel gear 186 at the outer end of the drive shaft. At its inner end each drive shaft 184 carries a bevel gear 187, and these bevel gears mesh with the bevel gear 188 on the spindle 163 of the vertical head V. Each of the spindles 183 is provided with a tool receiving socket 189. Thus, a number of spindles may be driven at the same time for gang operation, as, for example, gang drilling or other work. As the vertical head V is adapted for setting on the master head in various angular positions, and the auxiliary heads A are adapted for setting to various angular positions on the vertical head, the driven tools may be operated at any desired angle relative to the work on the table structure T.

On Figure 13, a modified auxiliary head A' is shown. This head, like the auxiliary heads A in Figure 11, are adapted to be mounted on the vertical head. The auxiliary head A' is useful where a tool is to be vertically moved or reciprocated. The drive shaft 184 is therefore provided at its outer end with a crank head 190 having a crank pin 191 extending between abutment collars 192 and 193 on the work-holding spindle 194 journalled in the head. In some instances, it will be desirable to effect rotation or rotary feed of the spindle and tool thereon during reciprocation thereof and, as shown, a worm gear 195 is connected by a spline 196 to a spindle 194 and is engaged by a worm pinion 197 on a shaft 198 journalled in the head, the shaft being provided with a hand wheel 199 so that the rotational feed or adjustment of the tool supporting spindle may be manually controlled.

With an arrangement such as shown on Figure 11, multiple milling, engraving or duplicating may be accomplished, that is, a number of work pieces may be simultaneously operated upon and formed in accordance with a master work piece or pattern P. In the arrangement shown in Figure 11, three work pieces can thus be simultaneously operated on by suitable tools supported from the main spindle 163 and auxiliary two spindles 183 on the auxiliary heads. By adjustment of the table structure and the vertical movement of the ram with the tool-supporting heads thereon, the work pieces are applied to the tools, and to enable such application to be made with precision, I provide a stylus unit S. The stylus unit shown is supported on an arm 200 extending from a base 201 which may be detachably applied in one of the dovetail channels in the master head frame (Figure 6). A stylus 202 is vertically shiftable on the stylus structure body and connected at its upper end with a pointer 203 on a dial 204. The lower end of the stylus engages the master work piece or pattern P to follow the profile thereof, and by proper adjustment of the tool-supporting structure for keeping the needle at a fixed point on the dial, the tools will form the work pieces in accordance with the pattern.

For such engraving or duplicating work, it may be desirable to operate the ram by hand, and in order that this may be conveniently accomplished, an operating lever is provided for the ram shaft 27 which is ordinarily driven by the motor 29. As best shown on Figures 5 and 14, a hub or drum 205 is keyed on the shaft 27 outside of the base B, this drum being engaged by the companion clutch members 206 and 207 hinged together at one end, as indicated at 208. A tubular handle bar or lever 209 extends from the clutch member 206, and a rod 210 extends through the lever and is attached at its lower end to the clutch member 207. A bell crank hand lever 211 is pivoted at 212 to the lever 209 with its lower leg pivoted to the outer end of the rod 210, a spring 213 being interposed between the grip end of the bell crank lever and the end of the lever 209. The spring tends to swing the bell crank lever to pull the rod for clamping of the clutch drum by the clutch members, and pressure on the grip of the bell crank lever will release the clutch members. With this arrangement, the lever 209 may be used to turn the shaft 27 to effect vertical movement of the ram, and by clutching and unclutching the clutch members by operation of the grip lever, the shaft 27 may be quickly and accurately turned for movement of the ram. As shown on Figure 1, the clutch lever is at the right side of the base B so as to be readily operable from the front of the machine by the machine operator.

I thus provide a compact machine which may be used for a great variety of work performance which ordinarily was performed on separate machines. I do not, however, desire to be limited to the exact construction, arrangement and operation shown and described, as changes and modifications may be made without departing from the scope of the invention.

I claim as my invention:

1. A machine of the class described comprising a pedestal, a ram mounted on said pedestal for vertical reciprocation, driving means for said ram on said pedestal, a work supporting table structure on said pedestal, a head mounted on said ram above said table structure for vertical movement on said ram, a power source on said pedestal, and a transmission train between said power source and said head including transmission gearing for movement of said head on said ram at variable speeds.

2. A machine of the class described comprising a pedestal, a ram vertically movable on said pedestal, adjustable driving means on said pedestal for said ram, a work-supporting table structure on said pedestal, a head mounted on said ram above said table structure and adapted for vertical movement thereon, a driving motor on said pedestal and a shaft to be driven thereby, speed change transmission gearing on said pedestal between said motor and said shaft, a transmission train between said shaft and said head for movement of said head on said ram, a work spindle in said head for operating tools supported by said head, a driving motor mounted on said head, and adjustable driving means between said head motor and said spindle.

3. A machine of the class described comprising a pedestal, a ram mounted on said pedestal for vertical movement thereon, a work-supporting table structure on said pedestal, a head to which various tool-supporting attachments or adapters may be detachably secured, said head being mounted on said ram above said table structure for vertical movement on said ram, a work shaft journalled in said head and adapted for driving connection with attachments applied to said head, a driving motor mounted on said head, and variable speed transmission means in said head for said work shaft adapted to be driven by said motor.

4. A machine of the class described comprising a pedestal, a work-supporting table on said pedestal, a ram on said pedestal rising above said table, a head to which adapters or tool-supporting attachments may be detachably applied, said head being mounted on said ram above said table for vertical movement on the ram, a horizontally extending work shaft in said head adapted at its outer end to directly receive tools to be driven or for coupling connection with adapters or attachments applied to said head, a vertical drive shaft in said head connected with said work shaft, reduction gearing in said head, a drive pulley on said head adapted for connection directly with said vertical drive shaft or through said reduction gearing, and a driving motor on said head having a driving pulley belt connected with said head pulley.

5. A machine of the class described comprising a pedestal, a ram vertically reciprocable on said pedestal, means controlling the reciprocation of said ram, a work-supporting table structure shiftable on said pedestal, a head mounted on said ram above said table structure for vertical movement thereon, power means, a driving connection between said power means and said head and a driving connection between said power means and said table structure, and means for setting said driving connection for separate or simultaneous movement of said head and table structure for application of tools on said head to work on the table structure.

6. A machine of the class described comprising a pedestal, a ram vertically movable on said pedestal, a work-supporting table on said pedestal, a head mounted on said ram above said table for vertical movement thereon, a power source, a transmission train for connecting said power source with said head for power movement of said head on said ram, and a transmission train for connecting said power source with said table for adjustment of said table on said pedestal.

7. A machine of the class described comprising a pedestal, a work-supporting table on said pedestal, a wall extending upwardly from said pedestal, a head to which adapters or tool-supporting attachments may be detachably applied, said head being mounted on said wall for vertical movement thereon above said table, a horizontally extending work shaft in said head adapted at its outer end to directly receive tools to be driven or for coupling connection with adapters or attachments applied to said head, a vertical drive shaft in said head connected with said work shaft, reduction gearing in said head, a motor on said head, a drive connection between said motor and said vertical shaft, and setting means adjustable to cause either direct drive of said vertical shaft or drive thereof through said reduction gearing.

8. A machine of the class described comprising a pedestal, a work-supporting table on said pedestal, a wall extending vertically upwardly from said pedestal, a master head mounted on said wall for vertical movement thereon above said table, driving means for moving said master head at a predetermined rate, a horizontally extending work spindle journalled in said master head, driving means in said master head for said spindle, a driving motor mounted on said master head for operating said driving means, a centering boss on the front wall of said master head concentric with said spindle, a vertical head receiving said boss and detachably secured to said master head, a vertical spindle in said vertical head, driving means for said vertical spindle in said vertical head, and drive coupling means for connecting said vertical spindle driving means with said spindle in the master head.

9. A machine of the class described comprising a pedestal, a work-supporting table on said pedestal, a wall extending vertically upwardly from said pedestal, a master head mounted on said wall for vertical movement thereon above said table, driving means for moving said master head at a predetermined rate, a horizontally extending work spindle journalled in said master head, driving means in said master head for said spindle, a driving motor mounted on said master head for operating said driving means, a centering boss on the front wall of said master head concentric with said spindle, a vertical head receiving said boss and detachably secured to said master head, a vertical spindle in said vertical head, driving means for said vertical spindle in said vertical head, drive coupling means for connecting said vertical spindle driving means with said spindle in the master head, auxiliary heads mounted on said vertical head, a work spindle for each of said auxiliary heads, and driving means for said auxiliary head spindles adapted to be driven by the spindle in said vertical head, said auxiliary heads being rotatably adjustable on said vertical head.

10. A machine of the class described comprising a pedestal, a ram vertically movable on said pedestal, driving means on said pedestal for said ram, a work supporting table structure on said pedestal, a head mounted on said ram above said table structure and adapted for vertical movement thereon, a driving motor on said pedestal, a transmission train between said driving motor and said head for effecting movement of said head on said ram, supporting means on said head for supporting tools or adapters to be driven, a driving motor mounted on said head, and driving means between said head motor and said supporting means.

11. A machine of the class described comprising a pedestal, a work-supporting table on said pedestal, a wall extending upwardly from said pedestal, a master head mounted on said wall for vertical adjustment thereon above said table, a horizontally extending work spindle journaled in said master head, driving means in said master head for said spindle, a motor mounted on said master head for operating said driving means, a centering boss on the front wall of said master head concentric with said spindle, an auxiliary head receiving said boss for rotational adjustment relative to said master head and to be detachably secured in adjusted position, a tool supporting spindle journaled in said auxiliary head, and a friction drive connection between the master head spindle and the auxiliary head spindle.

12. A machine of the class described comprising a pedestal, a work-supporting table on said pedestal, a wall extending vertically upwardly from said pedestal, a master head mounted on said wall for vertical movement thereon above said table, means controlling the vertical movement of said head, a horizontally extending work spindle journaled in said master head, driving means in said master head for said spindle, a driving motor mounted on said master head for operating said driving means, an auxiliary head adjustable rotatably on said master head and detachably secured thereto, a tool driving spindle in said auxiliary head, a beveled gear on said auxiliary head spindle, a driving beveled gear in said auxiliary head concentric with said master head spindle and engaging said auxiliary head spindle gear, and a detachable driving connection between said master head spindle and said driving beveled gear.

13. A machine of the class described comprising a pedestal, a work-supporting table on said pedestal, a wall extending vertically upwardly from said pedestal, a master head mounted on said wall for vertical movement thereon above said table, means controlling the vertical movement of said head, a horizontally extending work spindle journaled in said master head, driving means in said master head for said spindle, a driving motor mounted on said master head for operating said driving means, an auxiliary head adjustable rotatably on said master head and detachably secured thereto, a tool driving spindle in said auxiliary head, a beveled gear on said auxiliary head spindle, a driving beveled gear in said auxiliary head concentric with said master head spindle and engaging said auxiliary head spindle gear, and a friction drive connection between said driving beveled gear and the spindle in said master head.

FRANK W. HACK.